United States Patent
Ito et al.

(10) Patent No.: US 9,070,397 B1
(45) Date of Patent: Jun. 30, 2015

(54) WRITE CURRENT AND MEDIA HEATER CONTROL FOR HEAT OR MICROWAVE ASSISTED MAGNETIC RECORDING

(71) Applicant: HGST Netherlands B.V., Amsterdam (NL)

(72) Inventors: Naoto Ito, Kanagawa (JP); Jun Hashimoto, Kanagawa (JP); Erhard Schreck, San Jose, CA (US); Michiya Kazusawa, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/273,284

(22) Filed: May 8, 2014

(51) Int. Cl.
  *G11B 21/02* (2006.01)
  *G11B 5/60* (2006.01)
(52) U.S. Cl.
  CPC .................................... *G11B 5/6005* (2013.01)
(58) Field of Classification Search
  None
  See application file for complete search history.

(56) References Cited

U.S. PATENT DOCUMENTS

| | | | |
|---|---|---|---|
| 6,867,940 B2 | 3/2005 | Pleiss | |
| 7,990,647 B2 * | 8/2011 | Lille | 360/59 |
| 7,995,425 B2 | 8/2011 | Schreck et al. | |
| 8,077,418 B1 | 12/2011 | Hu et al. | |
| 8,315,128 B1 | 11/2012 | Wilson et al. | |
| 8,441,909 B1 | 5/2013 | Thayamballi et al. | |
| 8,760,779 B2 * | 6/2014 | Johns et al. | 360/31 |
| 2012/0099407 A1 | 4/2012 | Hipwell et al. | |
| 2013/0071062 A1 | 3/2013 | Peng et al. | |

OTHER PUBLICATIONS

Thermal Fly-height Control (TFC) Technology in HGST Hard Disk Drives, HGST Whitepaper, Nov. 2007, 3 pages, San Jose, CA, USA.

\* cited by examiner

*Primary Examiner* — K. Wong (57) ABSTRACT

A data storage device and method for improved flying height control (TFC) in a HAMR or MAMR system employing three heat sources to control the head protrusion: write coil current, TFC heater current, and media exciter power. The TFC heater is used to pre-heat the write head. The media exciter may be operated at a either a zero level or a low level below that required for the HAMR or MAMR process, optionally serving as an additional source of heat to the write head. The HAMR or MAMR data writing process commences only after the head protrusion has been increased and stabilized. During data writing, the media exciter power is increased to the higher level required to heat the disk medium in an HAMR or MAMR process and the TFC heater power is slightly reduced to maintain the total heat into the head approximately constant.

18 Claims, 6 Drawing Sheets

WRITE CURRENT AND MEDIA HEATER CONTROL FOR HEAT OR MICROWAVE ASSISTED MAGNETIC RECORDING

TECHNICAL FIELD

The present invention relates to data storage devices, and in particular to data storage devices with rotating disks above which read/write heads flying with a small head-to-disk clearance ("flying height") that may be controlled to preserve the integrity of a heat assisted magnetic recording (HAMR) process or a microwave assisted magnetic recording process (MAMR).

BACKGROUND

Data storage devices employ rotating data storage media such as hard disk drives. In a hard drive, data is written to the disk medium using a write head which generates a high localized magnetic field which aligns magnetic domains within the disk in one of two directions. In some cases, the magnetization direction is up or down relative to the plane of the disk (perpendicular magnetic recording, or PMR). In other cases, the magnetization direction is within the plane of the disk. In all cases, this data may then be read-out with a read head. The write and read heads are typically integrated within a single assembly. To achieve steadily increasing data storage densities (typically measured in bits/inch$^2$), which are now achieving levels near $10^{12}$ bits/in$^2$, the sizes of magnetic regions storing individual bits have been reduced to nm levels. Writing to, and reading from, such small regions may include shrinking the sizes of the read and write heads and also having them "flying" closer to the disk surface (since the magnetic forces drop rapidly with increasing distance between the disk and the head). The distance between the head and the disk is called the "flying height" since the head is said to "flying" above the disk on a cushion of compressed air which is entrained by the rapid rotation of the disk and then squeezed between the head (often called a "sled") and the disk. Very precise control of the flying height is achieved using "thermal flying height control" (TFC) which employs an electrical heater (with mW powers) to heat the pole pieces of the head, resulting in nm-level thermal expansion which pushes the pole pieces slightly closer to the spinning disk surface. In more recent hard drive data storage devices, such as that described in U.S. Pat. No. 7,990,647 B2, issued Aug. 2, 2011, the read/write head may also incorporate a near field light source or a microwave source. In the following description of embodiments, "light source" may be interpreted to also comprise "microwave source", and the term "Heat Assisted Magnetic Recording" (HAMR) may be interpreted to also comprise "Microwave Assisted Magnetic Recording" (MAMR). One purpose for this light source may be to locally heat the disk medium, thereby momentarily lowering the coercivity and thus reducing the required writing current. This writing process is known as "Heat Assisted Magnetic Recording", or HAMR. However, near field light sources are typically only 10% efficient in heating the disk medium, with the remainder of the laser power heating the write head. Thus the laser light source represents another potential method for heating the write head in order to increase protrusion and reduce the flying height for improved writing. There are three different sources of heat which may heat the write head, where all of these sources of heat may cause the pole pieces to expand and thus reduce the flying height of the write head above the disk medium: 1) the current flowing through the write head coil, 2) the current flowing through the flying height control heater, and 3) the majority (~90%) of the power flowing into the near field light source. Each of these three sources of heat to the write head has a different time constant for heating up (when power is applied) and for cooling down (when power is removed).

A goal of some embodiments is to provide a method for improved control of the head protrusion in a heat assisted magnetic recording or microwave assisted magnetic recording disk drive.

A further goal of some embodiments is to provide pre-heating and feed-forward control to increase the head protrusion during a pre-heating operation which precedes a writing operation.

A still further goal of some embodiments is to use feed-forward control of the power going into the head during the pre-heating operation.

Another goal of some embodiments is to use feed-back control of the media heater power during a writing operation to reduce the laser power decrease arising from heating of the laser diode used in an HAMR process.

SUMMARY

Aspects of some embodiments provide a method for improved data storage in a hard disk drive or other data storage device employing a rotating disk. In some embodiments, a pre-heating operation precedes a data writing operation, wherein during the pre-heating operation the head protrusion is thermally increased by heating the write head using the combined power from three sources: 1) the write head coil, 2) a thermal flying height heater, and 3) the HAMR laser light.

In some embodiments, the gradual drop off in laser power arising from heating of the laser diode is reduced and controlled by feedback.

DETAILED DESCRIPTION

Embodiments can provide one or more advantages over previous methods for dynamically controlling the flying height of read/write heads with respect to disk storage media. Not all embodiments may provide all the benefits. The embodiments will be described with respect to these benefits, but these embodiments are not intended to be limiting. Various modifications, alternatives, and equivalents fall within the spirit and scope of the embodiments herein and as defined in the claims.

Figure 1:
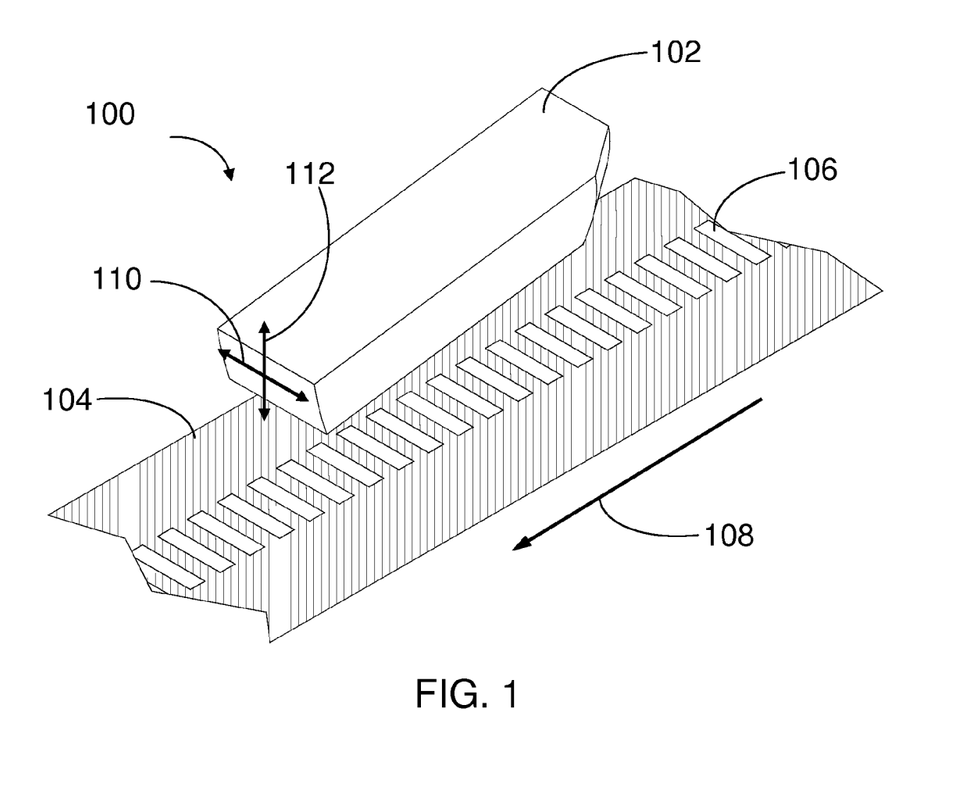
FIG. 1 is a schematic isometric diagram of a read/write head flying above a moving disk which has written data.

FIG. 1 is a schematic isometric diagram 100 of a read/write head 102 flying above a disk 104 moving in a direction 108. Some magnetized bits on the data track (each typically comprising a multiplicity of magnetic domains) are illustrated as clear rectangles 106. The read/write head 102 "flies" above the disk medium 104 typically at a distance of roughly ten nanometers. Aerodynamic effects between the lower surface of the head 102 and the upper surface of the disk 104 aid in maintaining this distance, termed the "flying height". Magnetic pole pieces in the lower surface of the head 102 detect magnetic transitions in the disk 104 such as bits 106. There are three possible relative motions of the head 102 with respect to the disk 104: 1) rotation of the disk 104 (arrow 108), 2) vertical motions corresponding to changes in the flying height (arrow 112), and 3) side-to-side motions of the head 102 relative to the data track represented by regions 106 (arrow 110). The head flying height affects the detected signal strength: increased flying height decreases the signal, while decreased flying height increases the signal while also increasing the probability of mechanical contact between the head 102 and the disk 104, potentially resulting in physical damage to disk 104 (a "head crash"). Thermal Flying height control (TFC) enables the distance of the write head to be dynamically controlled during disk operation.

Figure 2:
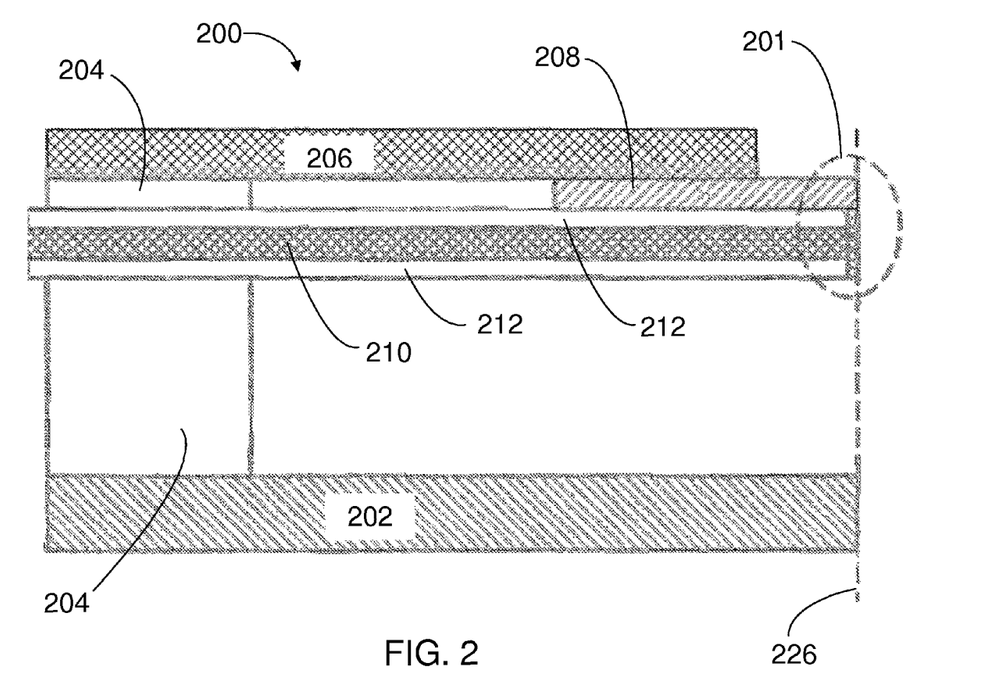
FIG. 2 is a partial cross-sectional view of a thin film head having resistive heating for thermal flying height control (TFC), and a laser for heat assisted magnetic recording (HAMR), in accordance with an embodiment.

FIG. 2 is a partial cross-sectional view 200 of a thin film head having resistive heating for thermal flying height control (TFC), and a laser for heat assisted magnetic recording (HAMR), in accordance with an embodiment. Some details such as coils, spacers, shielding, and read sensors have been omitted to simplify the figure and emphasize the features of the head with respect to some embodiments. Typical configurations and structures of these omitted details are familiar to those skilled in the art. The TFC resistive heaters have also been omitted in FIG. 2 since these would typically be outside the field of view of FIG. 2. The write head comprises lower return pole layer 202, back gap layers 204, upper return pole layer 206, and upper pole tip layer 208. Lower return pole layer 202 may also have a lower pole tip (not shown) at the air-bearing surface (ABS) 226. An optical waveguide for heat-assisted magnetic recording (HAMR) comprises an optical waveguide core 210, surrounded by cladding layers 212 at top and bottom in FIG. 2. As shown, layers 210 and 212 extend through at least a portion of back-gap layers 204, although other placements of back gap layer 204 are possible. The end portion of optical waveguide at which the laser light is directed to the disk medium surface is enclosed by near field transducer (NFT) 201. Within the volume enclosed by the ABS, back gap layer 204, lower return pole 202, and layers 206, 208, and 212, would be located the following (not shown): coil layers, and insulating and spacer layers, as would be familiar to those skilled in the art. Typically, layers 202, 204, 206, and 208 would be comprised of magnetic alloys or materials, such as ternary alloys of Co, Ni, and Fe, or binary alloys of Co/Fe and Ni/Fe. The optical waveguide 210 would typically be comprised of light transmitting materials such as tantalum pentoxide and/or titanium dioxide. Within some embodiments, the optical waveguide may have other designs such as a planar solid immersion mirror, or a planar solid immersion lens.

For heat assisted magnetic recording (HAMR), the light intensity transmitted along optical waveguide 210 would be set to a level sufficient to heat the local surface (i.e., between the upper pole layer 208 and lower pole layer 202), thereby momentarily reducing the magnetic susceptibility and thus assisting in the recording process by making it easier to change the magnetization direction of the magnetic domains in the disk medium. However, as mentioned above, typically only 10% of the laser power reaches the disk medium, with the remaining 90% of the laser power ending up as heat entering the write head. At laser power levels below that sufficient to assist in the recording process, useful amounts of heat may be introduced to the write heat for flying height control, in addition to the heat from the write coil and the TFC heater.

Figure 3:
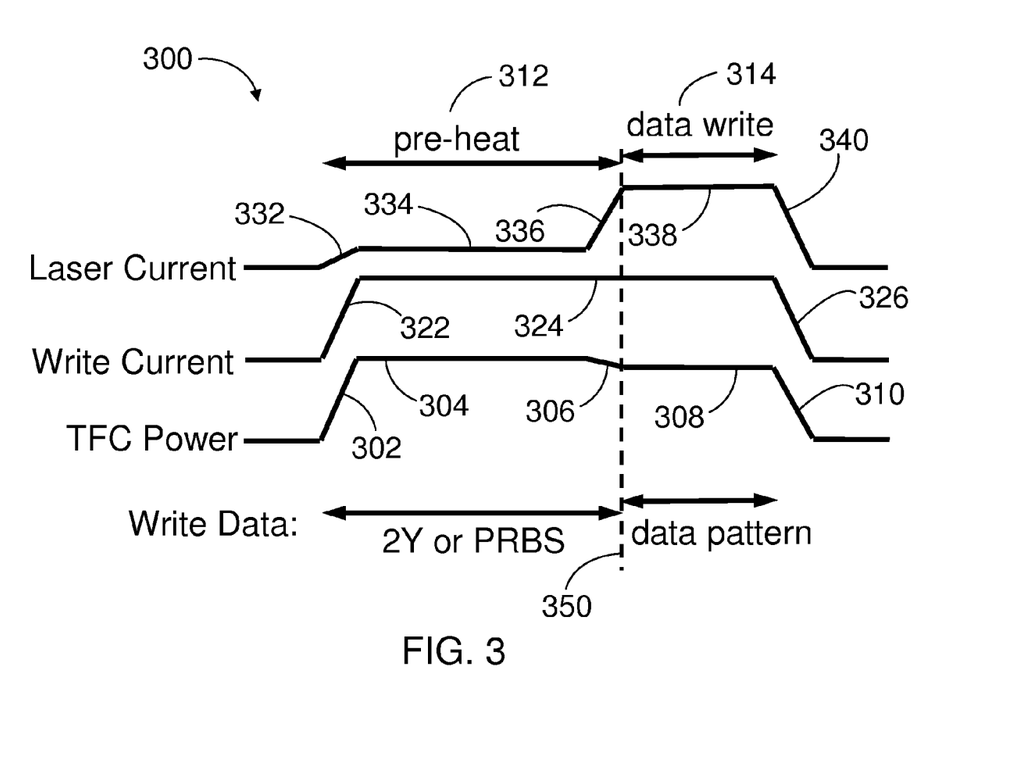
FIG. 3 is a timing diagram illustrating three sources of heat input to a write head during pre-heating and data writing according to an embodiment.

FIG. 3 is a timing diagram illustrating three sources of heat input to a write head during pre-heating and data writing according to an embodiment. A heat assisted magnetic recording (HAMR) head as three different time constants for heating which induce protrusion of the HAMR head:

1) The write flying coil time constant ranges from 100s of µs and is almost similar to the thermal flying height control (TFC) heater time constant,
2) The near field transducer (NFT) heat has a time constant of several µs, and
3) The time constant for deformation of the slider due to heat from the laser diode is several seconds.

Embodiments can eliminate the influence of the first of these three sources of protrusion of the HAMR head.

As illustrated in FIG. 3, prior to data writing, a pre-heat stage is used to stabilize the HAMR head protrusion arising from coil heating (#1, above). This is shown by the TFC power curve which rises 302 at the beginning of the pre-heat stage 312 to a stable and relatively high level 304 in which aimed flying height is achieved after this pre-heating stage 312. The write current rises 322 to a stable and relatively high writing level 324. During this pre-heat stage 312, the write head writes "2T patterns" or pseudo-random binary sequences (PRBS)". Also during the pre-heat stage 312, the laser current may optionally rise 332, but only to a stable and low steady level 334, insufficient for the requirements of the HAMR process.

Once the protrusion increase (corresponding to a flying height decrease) has stabilized, data writing 314 can commence. At this point, the write current remains at the previous level 324, but the TFC power is slightly reduced 306 to a new stable level 308. As the TFC power is slightly reduced, the laser current is substantially increased 336 to a new level 338, sufficient to perform the functions of heat assisted magnetic recording. HAMR requires that the laser intensity is sufficient to materially affect the coercivity of the disk recording medium —this corresponds to the laser level of 338 shown in FIG. 3. HAMR hard drives have highly anisotropic media. When excited by a light source the coercivity of the highly anisotropic media is reduced and the write head current can write bits of data to the highly anisotropic media. But when not excited by a light source the write head current is insufficient to write bits of data to the highly anisotropic media. MAMR hard drives have highly anisotropic media also, though possibly of different composition from that found in HAMR hard drives. When excited by a microwave source the coercivity of the highly anisotropic media is reduced and the write head current can write bits of data to the highly anisotropic media. But when not excited by a microwave source the write head current is insufficient to write bits of data to the highly anisotropic media. During data writing 314, flying height is maintained by controlling TFC power as much as possible. At the end of data writing with the HAMR method, the laser current drops 340, the write current drops 326, and the TFC power drops 310. Since all three power inputs to the write head drop at the end of data writing, the head will cool, resulting in thermal contraction and an increase in the flying height. As mentioned above, this increase in flying height may be desirable for reducing the possibility of head damage when moving to different sectors, and also has minimal effect on data reading operations.

Figure 4:
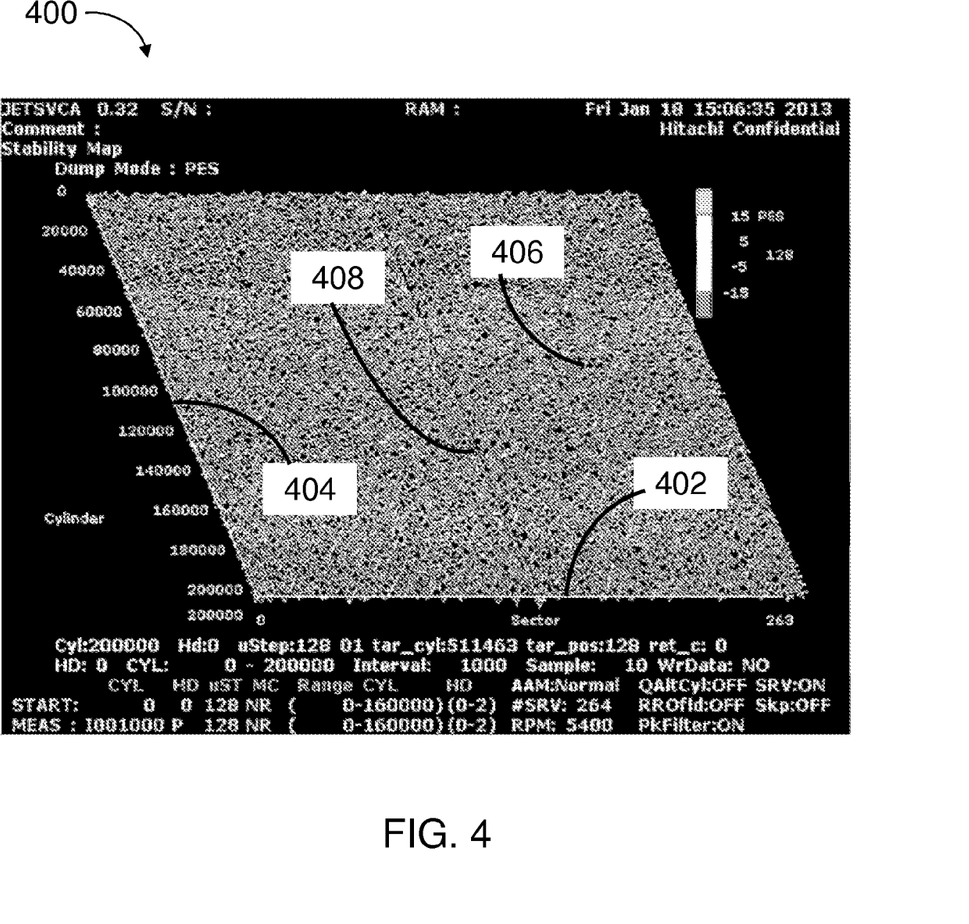
FIG. 4 is a graph of positional error signals (PES) obtained from a prototype heat assisted magnetic recording (HAMR) system.

FIG. 4 is a graph 400 of measured positional error signals (PES) obtained from a prototype heat assisted magnetic recording (HAMR) system. The horizontal axis 402 illustrates a full set of sectors (#0 to 263, giving 264 total) around the circumference of a disk storage medium. The angled vertical axis 404 corresponds to cylinders radially outwards across the disk storage medium. There is a noticeable jump in the PES at line 408, corresponding to the same sector for every cylinder, suggesting poor recording at this point around the circumference of the disk storage medium.

Figure 5:
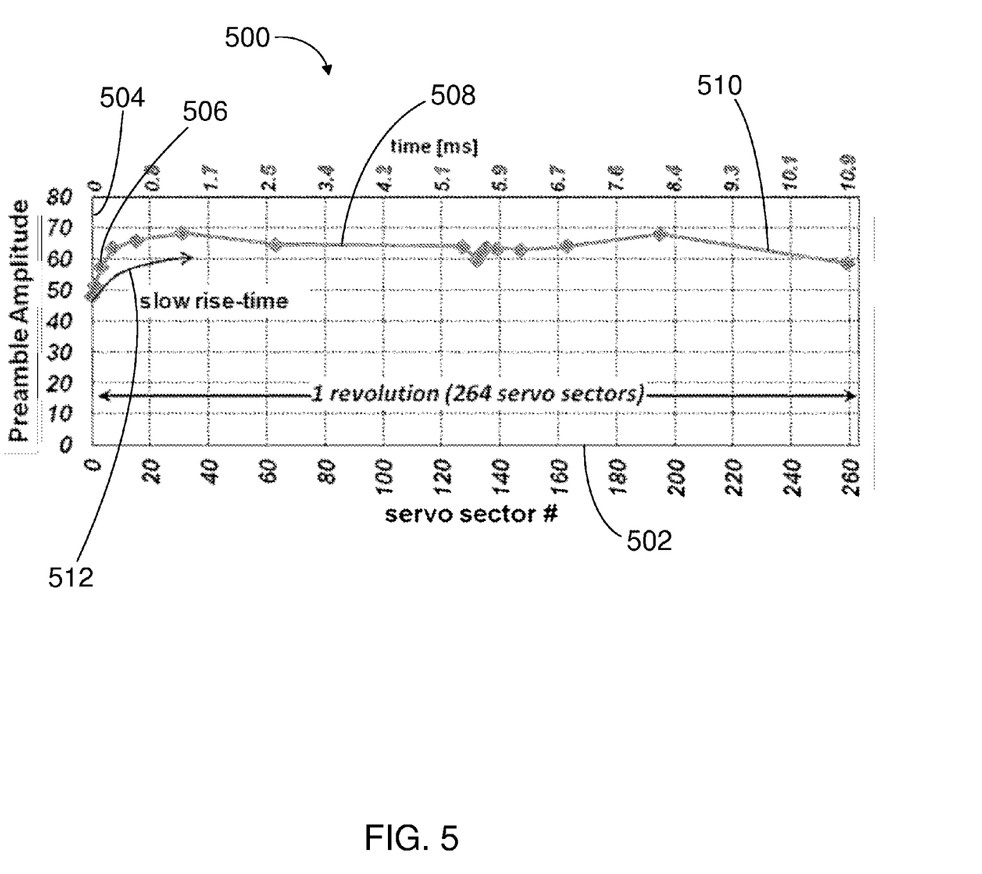
FIG. 5 is a graph of the preamble amplitude with respect to the servo sector.

FIG. 5 is a graph 500 of the preamble amplitude with respect to the servo sector. The horizontal axis 502 corresponds to the servo sectors from #0 to 263 (264 total) around the circumference of the data storage medium. The amplitude of the written preambles serves to indicate the writing strength of the head as a function of time, where writing commenced at servo sector #0 and proceeded around the disk storage medium to servo sector #263. Lower preamble amplitudes correspond to larger flying heights, which then result in reduced writing strengths. At the left of graph 500, a slow rise time 506 is evident (arrow 512), followed by stable writing 508 with a gradual decrease 510 over time (towards sector #263). Thus two problems that can be addressed by embodiments are: 1) the initial slow rise time, and 2) the gradual drop-off in laser power. The initial slow rise-time 512 is believed to stem from head protrusion (too large at the beginning). The origin of the slow drop 510 is believed to be heating of the laser diode. The non-optimal (too large) head protrusion which causes the slow rise time 512 may be addressed using the pre-heating procedure illustrated in FIG. 3, in conjunction with feed-forward control which initially increases 302 the TFC current to the level 304 (see FIG. 3) which is slightly above the TFC current 308 used for writing in order to more rapidly pre-heat the head prior to writing. Also, as shown in FIG. 3, the laser current may optionally be increased 332 to a low level 334 (insufficient for HAMR requirements) as an additional source of heat to the write head, further increasing the rate of heating and thus decreasing the flying height more rapidly. As a result, the use of increased TFC heating, and optionally low-levels of laser heating, may decrease the duration of slow rise 512 (section 506 on the curve).

Figure 6:
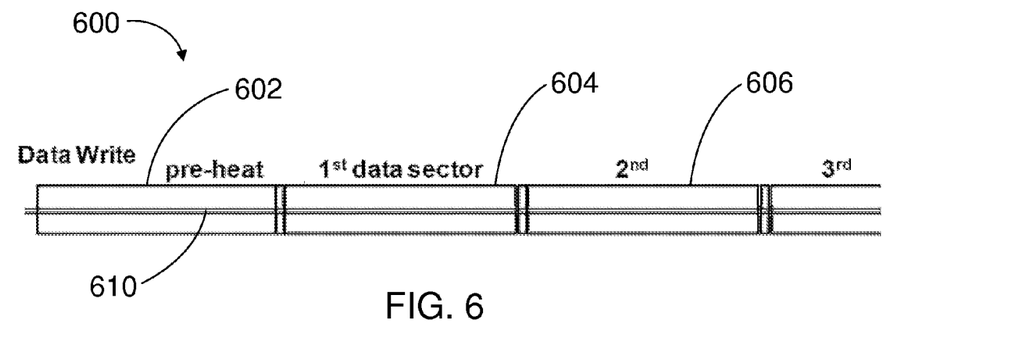
FIG. 6 is a schematic diagram of a multiplicity of sectors on a disk surface.

FIG. 6 is a schematic diagram 600 of a multiplicity of sectors 602, 604, 606, etc. on a disk surface with a track 610. That portion of track 610 within sector 602 is under the write head during the pre-heat operation. Sector 604 is the first sector to undergo data writing, followed by writing in sector 606, etc. During the pre-heating operation while the head is over sector 602, the head protrusion is increased by thermal expansion arising from a combination of the three heat sources (TFC power, write current, and laser current) illustrated in the graph 700 in FIG. 7. The laser current heat source is optional, while the TFC power and write current are used in all cases. In all cases, however, if the laser current is used as the third source of heating, the laser current can be at a low enough level (e.g., 334 or 774, in FIGS. 3 and 7, respectively) that the laser-induced heating of the magnetic storage medium is insufficient for the HAMR process.

Figure 7:
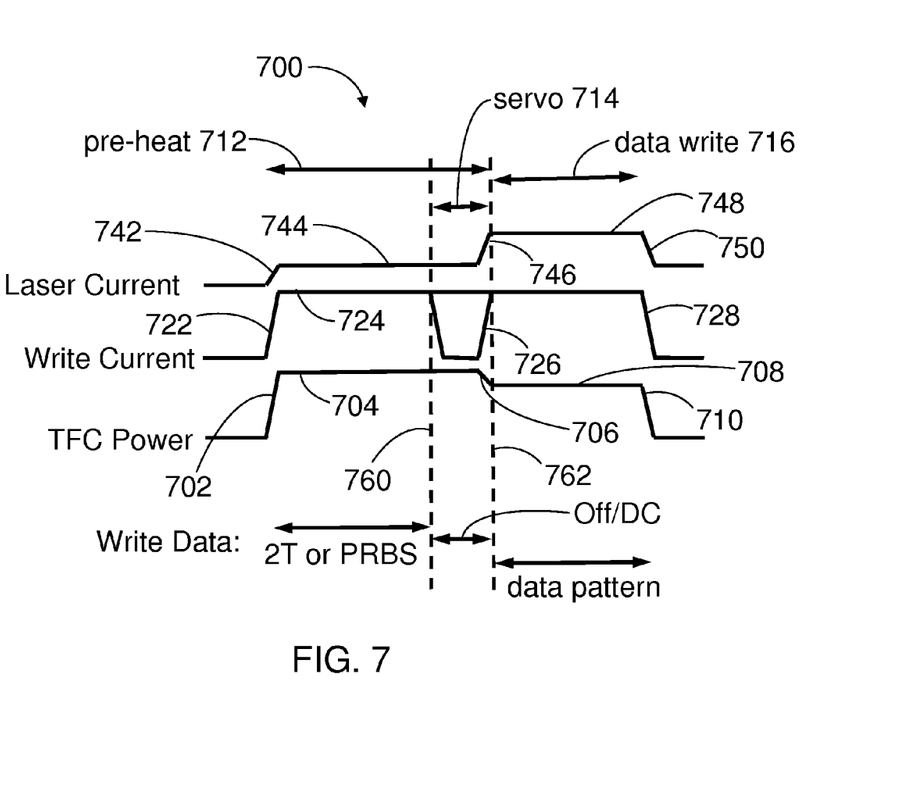
FIG. 7 is a timing diagram illustrating three sources of heat input to a write head according to an embodiment.

As illustrated in FIG. 7, prior to data writing in sectors 604 and 606 in FIG. 6, a pre-heat stage 712 is used to stabilize the HAMR head protrusion arising from write coil heating while the head is passing over sector 602 in FIG. 6. This is shown by the TFC power curve which rises 702 at the beginning of the pre-heat stage 712 to a stable and relatively high level 704. The write current rises 722 to a stable and relatively high writing level 724. During this pre-heat stage 712, the write head writes "2T patterns" or pseudo-random binary sequences (PRBS)". Also during the pre-heat stage 712, the laser current may optionally rise 742, but only to a stable and low steady level 744, insufficient for the requirements of the HAMR process.

Following the pre-heat stage, the head passes 714 across the servo region between sectors 602 and 604, and the head performs a reading operation of the servo bursts and other patterns within the servo region. While reading, the writing current may be turned off, as shown by the dip 726 in the write current, or the write data may be direct current with unchanged write current and either polarity for eliminating interference from the write current to the read data. This represents a decrease in the total heat going into the read/write head assembly and thus may cause a momentary decrease in protrusion and a corresponding increase in the flying height. Since the read operation is less sensitive to the flying height, this is less significant.

Once the protrusion increase (corresponding to a flying height decrease) has stabilized, data writing 716 can commence at sector 604. At this point, the write current either remains at writing level 724, or returns from dip 726, back to writing level 724, but the TFC power is slightly reduced 706 to a new stable level 708. As the TFC power is slightly reduced, the laser current is substantially increased 746 to a new level 748, sufficient to perform the functions of heat assisted magnetic recording. HAMR requires that the laser intensity is sufficient to materially affect the coercivity of the disk recording medium —this corresponds to the laser level of 748 shown in FIG. 7. At the end of data writing with the HAMR method, the laser current drops 750, the write current drops 728, and the TFC power drops 710. Since all three power inputs to the write head drop at the end of data writing, the head will cool, resulting in thermal contraction and an increase in the flying height. As mentioned above, this decrease in flying height may be desirable for reducing the possibility of head damage when moving to different sectors, and also has minimal effect on data reading operations.

Use of Microwave Excitation as an Alternative or in Addition to Laser Heating

In some embodiments, instead of, or in addition to, the laser heating described above, microwave excitation of the magnetic storage medium may be employed as is familiar to those skilled in the art. In this case, the terms "laser heating" would be interpreted as comprising also "microwave excitation". The term "media exciter" applies to both light optical waveguides employed in HAMR processes, as well as microwave sources employed in MAMR processes. Write head structures for implementing microwave excitation would be similar to that shown in FIG. 2 except the laser and laser optical waveguide would be substituted by a structure for directing microwaves to the surface of the highly anisotropic magnetic medium in the proximity of the write head.

Alternative Embodiments

Although embodiments have been described in the context of hard disk drives, it should be understood that various changes, substitutions and alterations can be made. Moreover, the scope of the present application is not intended to be limited to the particular embodiments of the process, machine, manufacture, or composition of matter, means, methods and steps described in the specification. As one of ordinary skill in the art will readily appreciate from the disclosure of embodiments, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A disk drive comprising:
   (a) at least one magnetic disk comprising highly anisotropic magnetic media;
   (b) a slider comprising a write head, a thermal flying height control (TFC) heater, and a media exciter;
   (c) a controller for regulating the write head current, the TFC heater current, and the media exciter current;
   wherein during a pre-heat cycle the controller enables the write head current and media exciter current but maintains the media exciter current below a high anisotropic writing threshold; and
   wherein during a data write cycle following the pre-heat cycle the controller maintains the write head current substantially unchanged from the write head current during the pre-heat cycle; and the controller increases the media exciter current to a level above the high anisotropic writing threshold.

2. The disk drive of claim 1, wherein the media exciter is a laser.

3. The disk drive of claim 1, wherein the media exciter is a microwave source.

4. The disk drive of claim 1,
   wherein the at least one magnetic disk comprises a plurality of data sectors and servo sectors; and
   wherein the write head current is disabled while the write head passes over servo sectors.

5. The disk drive of claim 1,
   wherein the controller maintains the TFC heater current at a first level during the pre-heat cycle and at a second level during the data write cycle; and
   wherein the first level is greater in magnitude than the second level.

6. A method for heat assisted magnetic recording in a disk drive system, comprising the steps of:
   configuring a disk drive system with:
      at least one magnetic disk comprising highly anisotropic storage media;
      a write head for writing data to the at least one magnetic disk, wherein the write head may be heated by a write head current;
      a thermal flying height control (TFC) heater for manipulating a spacing between the write head and the at least one magnetic disk, wherein the write head may be heated by a TFC heater current;
      a media exciter, wherein that portion of the surface of the at least one magnetic disk in the proximity of the write head may be heated by a media exciter power; and
      a controller for regulating the TFC heater current, the write head current, and the media exciter power to control the total heat being supplied to the write head;
   initiating a pre-heat stage by performing the steps of:
      increasing the TFC heater current to a relatively high level;
      increasing the write head current to a relatively high level;
      maintaining the media exciter power to either a zero level or to a relatively low level, wherein the media exciter power is insufficient for heat assisted magnetic recording; and
   after a predetermined amount of time, initiating a data writing stage by performing the steps of:
      reducing the TFC heater current;
      maintaining the write head current at approximately the same level as for the pre-heat stage; and
      increasing the media exciter power to a level sufficient for heat assisted magnetic recording.

7. The method of claim 6, further comprising feed-forward control of the TFC heater current which turns off or reduces the TFC heater current to a lower level when the media exciter power is increased as described in claim 6.

8. The method of claim 6, further comprising feed-back control of the media exciter power to regulate the rate of heating of the write head by the media exciter during the data writing stage.

9. A method for heat assisted magnetic recording in a disk drive system, comprising the steps of:
   configuring a disk drive system with:
      at least at least one magnetic disk comprising highly anisotropic magnetic media;
      a read head for reading data from the at least one magnetic disk;
      a write head for writing data to the at least one magnetic disk, wherein the write head may be heated by a writing current;
      a thermal flying height control (TFC) heater for manipulating a spacing between the read and write heads and the at least one magnetic disk, wherein the write head may be heated by a TFC heater current;
      a media exciter, wherein that portion of the surface of the at least one magnetic disk in the proximity of the write head may be heated by a media exciter power; and
      a controller for regulating the TFC heater current, the write head current, and the media exciter power to control the total heat being supplied to the write head;
   initiating a pre-heat stage by performing the steps of:
   increasing the TFC heater current to a relatively high level;
      increasing the write head current to a relatively high level;
      maintaining the media exciter power to a zero level or to a relatively low level, wherein the media exciter power is insufficient for heat assisted magnetic recording; and
      after arriving at a servo region between two sectors on the at least one magnetic disk, then initiating a reading data stage;
   during the reading data stage, reading data from a servo region using the read head, wherein during the reading process, the current to the write head may be changed to a reduced level or the write data may be direct current with either polarity; and
   after completing the reading data stage, initiating a data writing stage by performing the steps of:
      reducing the TFC heater current;
      maintaining the write head current at approximately the same level as for the pre-heat stage; and
      increasing the media exciter power to a level sufficient for heat assisted magnetic recording.

10. The method of claim 9, further comprising feed-forward control of the TFC heater current which reduces the TFC heater current to a lower level when the media exciter power is increased as described in claim 9.

11. The method of claim 9, further comprising feed-back control of the media exciter power to regulate the rate of heating of the write head by the media exciter during the data writing stage.

12. The method of claim 9, wherein the highly anisotropic data storage medium comprises a heat assisted magnetic recording medium, and wherein the media exciter comprises an optical waveguide.

13. A method for microwave assisted magnetic recording in a disk drive system, comprising the steps of:
configuring a disk drive system with:
at least one magnetic disk comprising highly anisotropic storage media;
a write head for writing data to the at least one magnetic disk, wherein the write head may be heated by a write head current;
a thermal flying height control (TFC) heater for manipulating a spacing between the write head and the at least one magnetic disk, wherein the write head may be heated by a TFC heater current;
a media exciter, wherein that portion of the surface of the at least one magnetic disk in the proximity of the write head may be heated by a media exciter power; and
a controller for regulating the TFC heater current, the write head current, and the media exciter power to control the total heat being supplied to the write head;
initiating a pre-heat stage by performing the steps of:
increasing the TFC heater current to a relatively high level;
increasing the write head current to a relatively high level;
maintaining the media exciter power to either a zero level or to a relatively low level, wherein the media exciter power is insufficient for microwave assisted magnetic recording; and
after a predetermined amount of time, initiating a data writing stage by performing the steps of:
reducing the TFC heater current;
maintaining the write head current at approximately the same level as for the pre-heat stage; and
increasing the media exciter power to a level sufficient for microwave assisted magnetic recording.

14. The method of claim 13, further comprising feed-forward control of the TFC heater current which turns off or reduces the TFC heater current to a lower level when the media exciter power is increased as described in claim 13.

15. The method of claim 13, further comprising feed-back control of the media exciter power to regulate the rate of heating of the write head by the media exciter during the data writing stage.

16. A method for heat microwave assisted magnetic recording in a disk drive system, comprising the steps of:
configuring a disk drive system with:
at least one magnetic disk comprising highly anisotropic storage media;
a read head for reading data from the at least one magnetic disk;
a write head for writing data to the at least one magnetic disk, wherein the write head may be heated by a writing current;
a thermal flying height control (TFC) heater for manipulating a spacing between the read and write heads and the at least one magnetic disk, wherein the write head may be heated by a TFC heater current;
a media exciter, wherein that portion of the surface of the at least one magnetic disk in the proximity of the write head may be heated by a media exciter power; and
a controller for regulating the TFC heater current, the write head current, and the media exciter power to control the total heat being supplied to the write head;
initiating a pre-heat stage by performing the steps of:
increasing the TFC heater current to a relatively high level;
increasing the write head current to a relatively high level;
maintaining the media exciter power to a zero level or to a relatively low level, wherein the media exciter power is insufficient for microwave assisted magnetic recording; and
after arriving at a servo region between two sectors on the at least one magnetic disk, then initiating a reading data stage;
during the reading data stage, reading data from a servo region using the read head, wherein during the reading process, the current to the write head may be changed to a reduced level or the write data may be direct current with either polarity; and
after completing the reading data stage, initiating a data writing stage by performing the steps of:
reducing the TFC heater current;
maintaining the write head current at approximately the same level as for the pre-heat stage; and
increasing the media exciter power to a level sufficient for microwave assisted magnetic recording.

17. The method of claim 16, further comprising feed-forward control of the TFC heater current which reduces the TFC heater current to a lower level when the media exciter power is increased as described in claim 16.

18. The method of claim 16, further comprising feed-back control of the media exciter power to regulate the rate of heating of the write head by the media exciter during the data writing stage.

* * * * *